United States Patent Office 2,855,402
Patented Oct. 7, 1958

2,855,402

3,3'-BIISOXAZOLE AND ITS PREPARATION FROM ACETYLENE AND NITRIC OXIDE

Richard David Cramer, Landenberg, Pa., assignor to E. I. du Pont de Nemours and Company, Wilmington, Del., a corporation of Delaware No Drawing. Application November 16, 1956
Serial No. 622,524

3 Claims. (Cl. 260—307)

This invention relates to a novel isoxazole and to methods of preparing the same.

Previously known isoxazoles are obtained from monoximes of β-diketones, from acetylene aldehydes and hydroxylamine and from various other starting ingredients.

It is an object of the invention to produce a novel isoxazole which is a valuable intermediate for the production of esters having utility as plasticizers for cellulose derivatives.

The novel compound of the invention is 3,3'-biisoxazole. The general method for preparing 3,3'-biisoxazole is by reacting acetylene with an oxide of nitrogen.

The reaction is carried out either batchwise or continuously in the presence or absence of an inert diluent. The inert diluent may be carbon dioxide isooctane, toluene, acetonitrile, ethyl acetate, dioxane, cyclohexane, benzene, acetic acid, etc.

When a reaction medium is used it may equal or exceed the weight of the acetylene charged into the reactor by ten or more times.

Nitric oxide or nitrogen dioxide may be used as the nitrogen oxide required for the reaction. Likewise oxides which dissociate into these oxides under reaction conditions can also be used.

The reaction between the acetylene and the nitrogen oxide is conducted at elevated pressures and temperatures. Generally, the pressures are in the range of 100–1500 lb./sq. in. and the temperatures in the range of 50–150° C. However, preferred pressures and temperatures are 200–700 lb./sq. in. and 80–100° C., respectively, to obtain the best yields.

The reaction between the acetylene and oxide of nitrogen is usually carried on until there is no further pressure drop.

The relative proportions of the reactants are not critical. The composition of the product requires 3 moles of acetylene and 2 moles of the oxide of nitrogen, with excesses of either remaining unreacted.

In one method of operation, a pressure reactor is charged with an inert reaction medium such as acetonitrile, the reactor is closed, cooled to 0° C. or lower, and evacuated. A predetermined amount of acetylene is then added from a storage vessel, calibrated so that the amount of acetylene added is measured by the drop in pressure, and the charged reactor is placed in a shaking device. Nitrogen oxide is then introduced to a pressure of 100–1500 lb./sq. in. and the mixture heated with agitation at a temperature between 50 and 150° C.

The above conditions are maintained until there is no further pressure drop. Throughout the reaction the pressure is maintained by periodic injections of nitrogen oxide. After reaction is complete the reactor is permitted to cool, unreacted acetylene and/or nitrogen oxide is vented to the atmosphere and the contents discharged. The desired biisoxazole is isolated by distillation, fractionation, sublimation, extraction, or other methods known to those skilled in the art.

The examples which follow illustrate but do not limit this invention.

Example 1

A stainless steel reactor of 80 ml. capacity was charged with 20 g. of acetonitrile, closed, chilled to 0° C. and evacuated. Thereafter, there was added 0.5 g. of acetylene and 1.3 g. of nitric oxide (NO). The reactor was attached to a shaking apparatus and warmed slowly so that a temperature of 90° C. was reached in three hours. Following an induction period of two hours at 90° C., the pressure within the reactor fell so that the total loss of pressure in the next hour corresponded to 195 lb./sq. in.

The product was removed from the reaction vessel with the aid of a methanol rinse. This product was combined with the products of three similar experiments in which 2 g. of acetylene and 5.2 g. of nitric oxide were used. The resulting solution was concentrated by removal of solvent through a five-inch Vigreaux column. During concentration a solid separated in the still pot and when the volume of the liquid in the pot had been reduced to about 10 ml., this solid, which proved to be ammonium nitrate, was filtered off.

The filtrate was subjected to further distillation and fractions were collected boiling at 59° C./13 mm. mercury to 63° C./7 mm. mercury and a second fraction at 63° C./2–4 mm. mercury pressure. At this point a solid crystallized in the distillation column. The crude distillates were combined and distilled through an eight-inch precision column. Two grams of liquid boiling at 48° C./7 mm. mercury was obtained.

As this liquid stood at room temperature for several days, large colorless crystals were deposited which proved to be identical with the solid which had crystallized in the distillation column during the first purification step. The solid melted at 63° C. and was soluble in ether, acetone, methanol, chloroform, and carbon tetrachloride and insoluble in water. This product was characterized as 3,3'-biisoxazole by composition and infrared, ultraviolet and nuclear magnetic resonance analyses, and by preparation of derivatives. The product analyzed:

Calc'd for $C_6H_4N_2O_2$: C, 53.0%; H, 2.94%; N, 20.60%.
Found: C, 53.8%; H, 3.21%; N, 20.71%.

The infrared spectrum contained absorption bands at 3.2 microns and 6.0 microns indicating a 5-membered nitrogen-containing heterocycle. The nuclear magnetic resonance spectrum indicated that the compound contained two kinds of hydrogen present in equal amounts. The ultraviolet absorption spectrum indicated that the substance was not a benzenoid material, and comparison of spectra with that of an authentic sample of o-dinitrosobenzene proved it could not be this material.

A 3 g. sample of 3,3'-biisoxazole obtained in subsequent experiments was dissolved in 100 ml. of 50% sulfuric acid. The resulting solution was cooled to 10°–15° C. Powdered potassium permanganate was added slowly to the stirred solution so that in three hours 10 g. of permanganate had been used. The reaction mixture was partially neutralized by the addition of 20 ml. of 50% sodium hydroxide solution and the acid was extracted with ether. The organic acid was recovered from ether by extraction with 10 ml. of 4 M sodium hydroxide. The alkali extract was acidified with sulfuric acid and the organic acid extracted with ether.

Evaporation of the ethereal solution gave a carboxylic acid which melted at 149° C. and had a neutral equivalent of 115. 3-isoxazolecarboxylic acid is reported to melt at 149° C. [Quilico and Panizzi, Chem. Abstracts 39, 2753 (1945)] and has a neutral equivalent of 116.

Composition of the acid obtained by oxidation of the 3,3'-biisoxazole was:

*Analysis.*—Calc'd for $C_4H_3NO_3$: C, 42.5%; H, 2.66%; N, 12.40%. Found: C, 42.24%; H, 2.79%; N, 12.33%.

An 0.8 g. sample of the above 3-isoxazole carboxylic acid was converted to an amide by reaction with thionyl chloride followed by treatment with ammonia. The sublimed and recrystallized product melted at 134°–135° C. as compared with a melting point of 143.5°–144° C. for the amide of 3-isoxazolecarboxylic acid and a value of 173–174° C. for the amide of 5-isoxazolecarboxylic acid, reported by Quilico and Panizzi. The experimental amide analyzed:

Calc'd for $C_4H_4O_2N_2$: C, 42.80%; H, 3.57%; N, 25.00%. Found: C, 41.54%; H, 4.08%; N, 22.88%.

A 2.5 g. sample of the 3-isoxazolecarboxylic acid, prepared as above, was esterified by reacting it with diazomethane. The resulting methyl 3-isoxazolecarboxylate boils at 104° C./27 mm. 0.4 g. of the methyl 3-isoxazolecarboxylate was added to a solution of 2 g. of cellulose acetate in 10 ml. of methyl ethyl ketone. A 2 mil thick film was cast from the resulting clear, homogeneous solution. The film was clear and had better flexibility and extensibility characteristics than a similar film of cellulose acetate similarly prepared but containing no ester. It is thus apparent that the methyl 3-isoxazolecarboxylate is an effective plasticizer for cellulose acetate.

*Example 2*

A 400 ml. stainless steel reactor was charged with 100 ml. of acetonitrile and purged with oxygen. The reactor was closed, chilled to 0° C. and further charged with 20 g. of acetylene. The charge was heated to 80° C. and nitric oxide was injected, so that at 80° C. the total pressure within the reactor was 600 lbs./sq. in. During a reaction period of five hours, during which time the pressure was maintained at 425 to 600 lbs./sq. in. by periodic injections of nitric oxide, the total observed pressure drop corresponded to 650 lbs./sq. in. Thereafter, the reactor was permitted to cool, opened, and the contents discharged. The products from this and four similar experiments were combined and concentrated by distillation through an eight-inch Vigreaux column. Following the distillation of an unidentified reaction by-product at 80° C./8 mm. mercury pressure, 51.5 g. of 3,3'-biisoxazole was recovered from the distillation residue by sublimation at 2 mm. pressure. The conversion, based upon the acetylene charged, was 30%.

*Example 3*

An 80 ml. reactor was charged with 50 ml. of acetonitrile, closed, chilled to 0° C. and evacuated, then further charged with 4 g. of nitrogen dioxide and 4 g. of acetylene. The reactor was heated to 80–81° C. for 18 hours. The product was distilled under vacuum through an eight-inch Vigreaux column. Following the distillation at 43°–47° C./11–12 mm., a solid $C_6H_4N_2O_2$, identical with the product described in Example 1, sublimed into the still at a pressure of 4 mm. The yield of 3,3'-biisoxazole was 1.9 g. corresponding to a conversion of 27%.

*Example 4*

A 400 ml. stainless steel reactor was charged with 100 cc. of acetic acid and purged with oxygen. The reactor was closed and charged at 20° C. with 14.5 g. of acetylene. Nitric oxide was then added until the total pressure was 300 lbs./sq. in. It was heated to 85° C. and repressured periodically with nitric oxide to maintain a total pressure of about 600 lbs./sq. in. Twenty-eight grams of nitric oxide was added over a period of one hour, fifteen minutes. The heating of the reaction mixture was continued for two hours after completion of the addition of the nitric oxide.

Fractional distillation gave the following products: 10.5 g. of 3,3'-biisoxazole (B. P. 85° C./5 mm.), 1.8 g. of isoxazole-3-carboxaldehyde (B. P. 60° C./40 mm.), 3.1 g. of 3-cyanoisoxazole (B. P. 70° C./25 mm.), and 1.2 g. of unidentified liquid (B. P. 65–68° C./5 mm.).

The nuclear magnetic resonance spectrum of the 3-cyanoisoxazole indicated two different kinds of hydrogen present in equal amounts and of the same type as in the 3,3'-biisoxazole. Infrared spectrum showed bands assignable to cyano group and to the isoxazole ring. Composition of the liquid was:

*Anal.*—Calc'd for $C_4H_2N_2O$: C, 51.06%; H, 2.15%; N, 29.78%. Found: C, 51.65%; H, 2.61%; N, 28.55%.

The nuclear magnetic resonance spectrum of the isoxazole-3-carboxaldehyde showed three different kinds of hydrogen present in equal amounts, one being an aldehyde hydrogen and the other two of the same type as in 3,3'-biisoxazole. Infrared spectrum showed bands assignable to aldehyde group and isoxazole ring. The composition of this liquid was:

*Anal.*—Calc'd for $C_4H_3NO_2$: C, 49.5%; H, 3.120%; N, 14.43%. Found: C, 48.9%; H, 3.144%; N, 14.05%.

A 2,4-dinitrophenylhydrazone with a M. P. of 203–6° C. was prepared from the aldehyde. The composition of this solid was:

*Anal.*—Calc'd for $C_{10}H_7N_5O_5$: C, 43.33%; H, 2.55%; N, 25.27%. Found: C, 43.50%; H, 2.81%; N, 23.77%.

*Example 5*

A 400 ml. stainless steel reactor was charged with 100 cc. of ethyl acetate and purged with oxygen. The reactor was closed, chilled to 0° C., and further charged with 20 g. of acetylene. At 25° C. nitric oxide was added until the total pressure was 350 lbs./sq. in. The charge was heated to 85° C. and, while maintaining this temperature the reactor was periodically repressured with nitric oxide while maintaining a top total pressure of 600 lb./sq. in. The addition of nitric oxide was stopped when a total of 28 g. had been added. The addition was carried out over a period of 1.5 hours and the reaction mixture was heated for two hours longer.

Fractional distillation gave the following products: 15.5 g. of 3,3'-biisoxazole, 2.8 g. of isoxazole-3-carboxaldehyde, 3.5 g. of 3-cyanoisoxazole, and 1.2 g. of an unidentified liquid.

*Example 6*

A 400 ml. stainless steel reactor was purged with oxygen and then was charged in order with 5 g. of acetylene, 11 g. of carbon dioxide, and 6.4 g. of nitric oxide at 20° C. The reactor was heated to 85° C. and an additional 4.0 g. of nitric oxide was added. The reaction mixture was held at 85° C. for 13 hours.

Fractional distillation of the product obtained gave the following: 1.2 g. of 3,3'-biisoxazole, 0.3 g. of 3-cyanoisoxazole, and 0.4 g. of an unidentified liquid.

In a similar experiment, except that no carbon dioxide was added as a diluent for the gas-phase reaction, the acetylene decomposed with a temperature flash to 275° C. on addition of the nitric oxide. The acetylene was decomposed to carbon and hydrogen.

As illustrated in the last part of Example 1, the 3,3'-biisoxazole of this invention can be oxidized to 3-isoxazole carboxylic acid which is useful in the preparation of esters by reaction with monohydric and polyhydric alcohols. These esters find utility as plasticizers for cellulose derivatives.

I claim:

1. A method for preparing 3,3'-biisoxazole which comprises reacting acetylene with nitric oxide in the presence of an inert diluent at pressures of 100–1500 lbs./sq. in. at a temperature of 50–150° C.

2. A method for preparing 3,3'-biisoxazole which comprises reacting acetylene with nitric oxide in the presence of acetonitrile at pressures of 200–700 lb./sq. in at a temperature of 80–100° C.

3. 3,3'-biisoxazole.

References Cited in the file of this patent

McKie: Chem. Abstracts, vol. 21, page 2658 (1927).
Quilico et al.: Chem. Abstracts, vol. 24, pages 3484–6 (1930).
Quilico et al.: Chem. Abstracts, vol. 24, pages 3788–9 (1930).
Quilico et al.: Chem. Abstracts, vol. 25, pages 1247–9 (1931).
Quilico et al.: Chem. Abstracts, vol. 25, pages 4548–9 (1931).
Ferri, et. al.: Chem. Abstracts, vol. 25, page 5168 (1931).
Quilico et al.: Chem. Abstracts, vol. 26, pages 454–5 (1932).
Quilico et al.: Chem. Abstracts, vol. 26, pages 1606–7 (1932).
Quilico et al.: Chem. Abstracts, vol. 42, Cols. 5904–5 (1948).
Dayton: Compt. rend. (Fr. Acad.), vol. 237, pages 185–6 (1953).